A. KOCH.
LIQUID FUEL BURNER.
APPLICATION FILED JAN. 4, 1908.

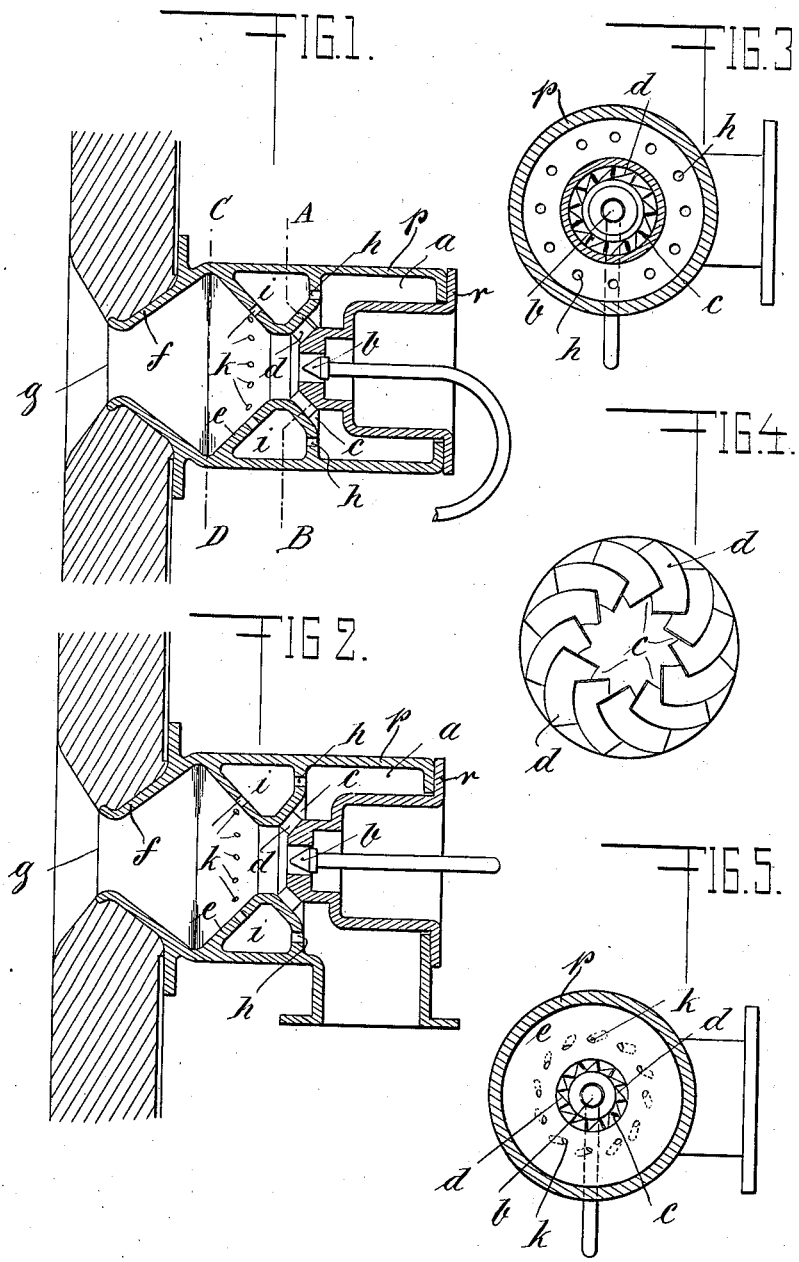

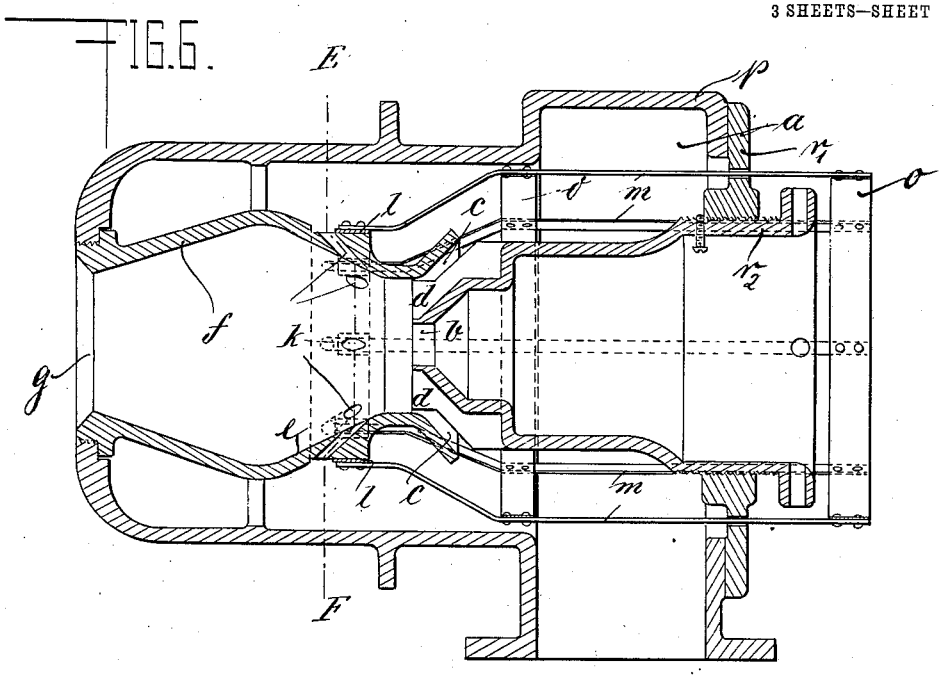
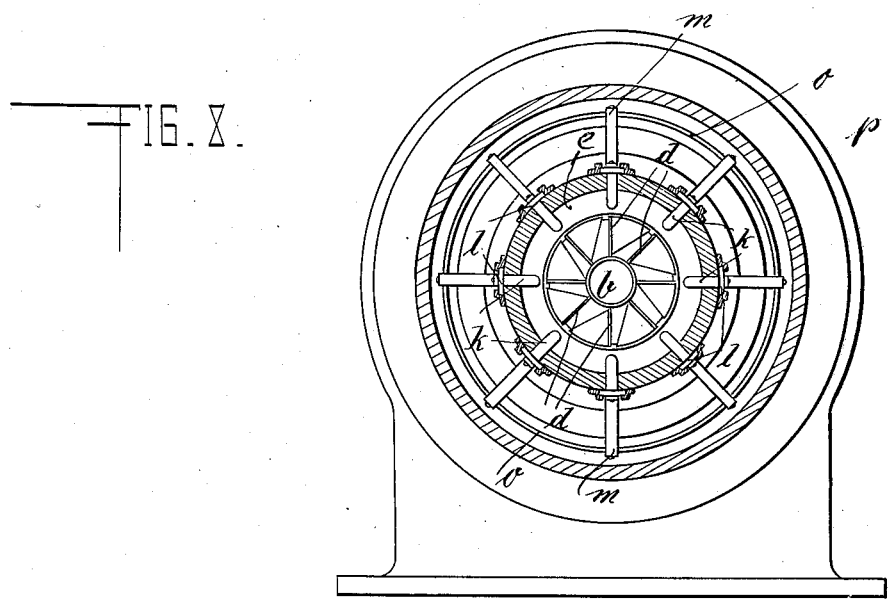

940,813.

Patented Nov. 23, 1909.
3 SHEETS—SHEET 3.

Witnesses:
H. H. Knight
H. Alfred Faulke

Inventor:
August Koch
by
Knight Bros
Attys

UNITED STATES PATENT OFFICE.

AUGUST KOCH, OF HANOVER-LIST, GERMANY.

LIQUID-FUEL BURNER.

940,813.
Specification of Letters Patent.
Patented Nov. 23, 1909.

Application filed January 4, 1908. Serial No. 409,344.

*To all whom it may concern:*

Be it known that I, AUGUST KOCH, manufacturer, a subject of the German Emperor, residing at Hanover-List, German Empire, have invented new and useful Improvements in Liquid-Fuel Burners, of which the following is a specification.

My invention relates to an apparatus for carrying out a method of combustion of liquid fuel, in particular of heavy oils such as, for instance, tar oils, which method is described in detail and claimed in a co-pending application Serial No. 466,653, filed December 9th, 1908.

The burners are especially adapted for smelting or similar furnaces in which high temperatures are required, and the particular purpose of same is the thorough disintegration and vaporization of the kind of oils above referred to, both of which are in the apparatus shown complete enough so as to obtain the best efficiency and highest temperature possible.

The essential feature of the method above referred to consists in forming a strong air whirl or eddy and in injecting the oil therein. This operation causes the oil particles to be disintegrated and thoroughly atomized and distributed in the air. Heavy oils in particular are atomized by this process into much finer particles and are much more thoroughly mixed with the air than if the oil is previously mixed with air to form a vapor and then blown in the same direction into an air current for combustion. The strong air whirl produced in the burner to be hereinafter described forms to a certain extent a resistive medium in which the oil is atomized.

In order to carry out the method above referred to in practice, a strong current of air is blown into a mixing chamber through two groups of apertures arranged in the walls of the chamber or in adjoining portions thereof, each of said groups directing the current of air at a suitable angle toward the air current through the other group, so that strong eddy currents of air are produced thereby. Into these currents the fuel is blown in a fine stream through a nozzle and thoroughly atomized and vaporized by the eddys, and mixed with the proper amount of air to form the combustible mixture.

As will be hereinafter described means may be provided for regulating the amount of air admitted to the chamber through the apertures so as to thus render the burner adapted for producing any desired mixture of fuel and air.

Figure 7:
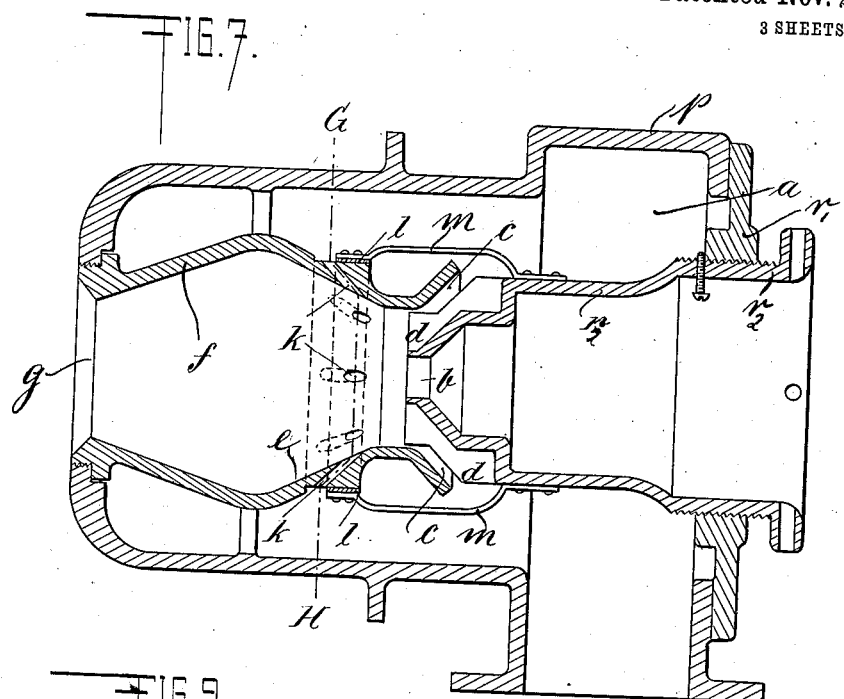
Figure 9:
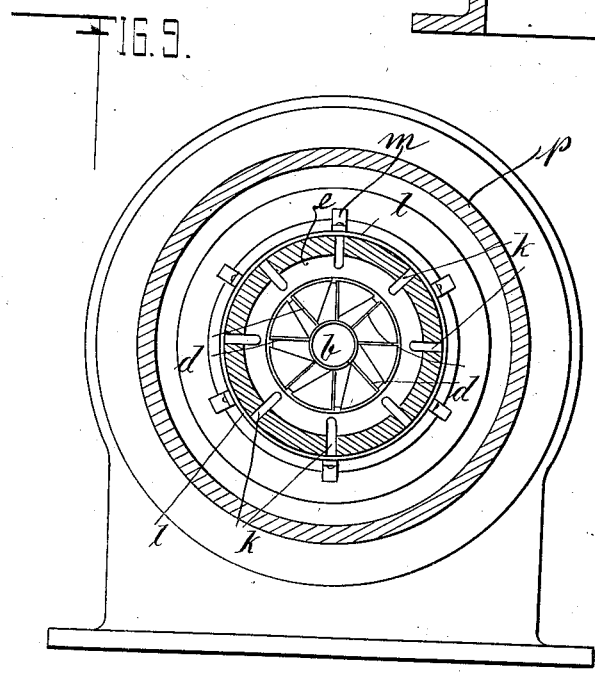

I have illustrated the structure of my novel burner in the accompanying drawings, in which:

Figure 1 is a vertical longitudinal section of the burner; Fig. 2 is a horizontal longitudinal section thereof; Fig. 3 is a vertical transverse section on the line A—B of Fig. 1; Fig. 4 is a detail view of the arrangement of vanes or blades $d$ in Fig. 3. Fig. 5, is a section on the line C—D of Fig. 1; Fig. 6 is a vertical longitudinal section of the burner and the air regulating device showing a modified form of construction; Fig. 7 is a vertical longitudinal section of the burner shown in Fig. 6 with another form of the means for regulating the air; and Figs. 8 and 9 are transverse sectional elevations on the line E—F of Fig. 6, and G—H of Fig. 7, respectively.

The burner as shown in Fig. 1 consists of a hollow preferably cylindrical body or casing $p$ in which a cup-shaped member $r$ is disposed so as to form an annular space $a$ for conveying the air for combustion. Within cup $r$ the fuel nozzle $b$ is disposed. Near nozzle $b$ the chamber $a$ is contracted and shaped into passages $c$ surrounding nozzle $b$, which have such a position relatively to nozzle $b$ that their axes intersect each other in front of it. These passages $c$ are formed by vanes or blades $d$ preferably spirally twisted (Figs. 3 and 4), which compel the combustion air while passing between it to assume a whirling motion. Owing to the direction of the passages $c$ above referred to, the jets of compressed air escaping from these passages cross each other in front of nozzle $b$.

A chamber $i$ is provided in the cylindrical body of the burner, adjoining chamber $a$, which communicates through circularly arranged aperture $h$ with chamber $a$ and through circularly arranged apertures $k$ with a chamber comprising the portions $e$ and $f$. This latter chamber into which also aperture $c$ and nozzle $b$ lead, may be double cone shaped as shown in the drawings or may be of any other suitable form such as for instance spherical or oval. It may be integral with casing $p$ as shown in Figs. 1 and 2 or form an independent body which as shown in Figs. 6 and 7 is suitably fastened to casing $p$. This group of apertures $k$ may lead in various directions into chamber $e$. As shown for instance in Figs. 1, 2 and 5, apertures $k$ have a direction substantially tangentially to the circle in which they are disposed opposite to the tangential direction of apertures $c$, and they are at the same time inclined toward the longitudinal axis of casing $p$ in the direction of the flow of fuel as may be seen from Figs. 1 and 2. By this arrangement, a twofold mixing of fuel and combustion air takes place as follows. Owing to the air currents of the two groups of apertures crossing each other and owing to their diversion by the walls of chamber $e$, a most effective and powerful whirl or eddy is produced. Into this whirl, the gaseous or liquid fuel is blown through nozzle $b$ in a fine jet. The gyratory movement of the air atomizes the oil very finely, thereby at the same time causing its thorough mixing with the air so that the flame escaping from the mouth $g$ of burner $f$ is of great intensity and force.

Apertures $k$ may be also arranged in the direction shown in Figs. 6 and 7. As is indicated in the modifications shown in these two figures, compartment $e\ f$ forms an independent body suitably fastened to casing $p$. Furthermore no separate chamber $i$ is provided in this instance, but annular chamber $a$ extends forward, and the portion of chamber $e$ toward cup-shaped member $r^2$ has flaring edges so as to form together with this member and its vanes $d$ apertures $c$. Apertures $k$ are again circularly arranged in the walls of compartment $e$ but contrary to the manner illustrated in Figs. 1, 2 and 5, have a direction toward member $r^2$ opposite to the direction in which the fuel is injected into compartment $e$. Furthermore, apertures $k$ are not inclined tangentially to the circle in which they are disposed as indicated in Fig. 5, but every aperture $k$ is located throughout its whole length in the direction of a plane through the longitudinal axis of casing $p$, as may be clearly seen from Figs. 6 to 9. The effect obtained by disposing the row of apertures $k$ in this manner is similar to that obtained by disposing apertures $k$ in the manner previously described. The current of air through aperture $k$ in this case cuts the current through apertures $c$ approximately in the longitudinal axis of casing $p$, at the point where the fuel is injected, and the latter is thoroughly atomized as previously described.

In order to adapt the burner for the use of any mixture of fuel and air and for producing a flame of any desired intensity, I have provided a regulating device by means of which the air aperture $k$ may be partially or entirely closed as desired. This device is illustrated in Figs. 6 and 8 and a modification thereof in Figs. 7 and 9.

Referring to Figs. 6 and 8, the device illustrated in these figures consists of slides arranged in front of apertures $k$, the movement of which is controlled from the outside by means of sliding rods $m$ extending through member $r^1$, and connected with each other by ring $o$, so that these rods may be properly spaced. It will be seen that when the rods are shifted to the left (Fig. 6) by suitable means not shown in the drawing, slides $l$ will close apertures $k$ as far as desired so that any desired quantity of air may be admitted to chamber $e$ through apertures $k$. Any suitable means may be of course employed for indicating on the outside of the burner the position of slides $l$ relatively to apertures $k$, and I have omitted to show this means in the drawing as being well known in the art.

In the modification shown in Figs 7 and 9, no individual slides are provided for apertures $k$ but a ring $l$ surrounding compartment $e$ at the outside will simultaneously open or close apertures $k$ according to the degree to which it moves to the left or to the right. Ring $l$ is connected by rods $m$ to the cup-shaped member $r^2$ which in turn is threaded into the disk-shaped member $r^1$ which is suitably fastened to casing $p$. By revolving member $r^2$ in either direction, it will be seen that ring $l$ may be moved to the left or to the right (Fig. 7), as required. It will also be noted that when member $r^2$ is revolved in either direction apertures $c$ will increase or decrease with the increase or decrease of apertures $k$. Thus both groups of apertures may be regulated at the same time and any desired mixture of fuel and air thereby produced.

While I have shown in the drawings two distinct manners in which the two groups of apertures may be disposed in their direction relatively to each other, and while I have shown two distinct manners for opening and closing one or both groups of apertures in order to vary the mixture of fuel and air, I do not wish to limit myself to these modifications, as it is obvious that the purposes of the apparatus may be obtained in various different manners.

What I claim is:

1. In an apparatus of the character described a mixing chamber and a fuel nozzle adapted to inject fuel into said chamber, said chamber having two groups of apertures for leading the combustion air into it, one group of apertures located near the end of said chamber and near said nozzle, and adapted to lead one part of the combustion air into the chamber to form a whirl in one direction, the other group of apertures disposed in the wall of said chamber to lead the other part of combustion air into said chamber, in a direction substantially opposing the general direction of said whirl to produce strong eddy currents in said chamber, substantially on the line in which the fuel is injected.

2. In an apparatus of the character described a mixing chamber and a fuel nozzle adapted to inject fuel into said chamber, said chamber having two groups of apertures for leading the combustion air into it, one group of apertures located near the end of said chamber and near said nozzle, and adapted to lead one part of the combustion air into the chamber to form a whirl in one direction, the other group of apertures disposed in the wall of said chamber to lead the other part of combustion air into said chamber, in a direction substantially opposing the general direction of said whirl to produce strong eddy currents in said chamber, substantially on the line in which the fuel is injected, and means for regulating the size of said apertures.

3. In an apparatus of the character described in combination with a burner casing, a mixing chamber within and near the mouth of said casing having a flaring opening at its inner end, a cup-shaped member within said casing forming an annular space therewith adapted to conduct compressed combustion air and having its inner end contracted and extending part way into the flaring end of said chamber with a space of suitable width between it and the chamber wall, vanes on said end of said member, forming in said space a plurality of spirally shaped apertures to conduct part of the combustion air, a fuel nozzle disposed in said cup-shaped member adapted to inject fuel into said mixing chamber, said chamber having a circularly disposed group of apertures in its wall inclined in their direction to lead the other part of said combustion air into the chamber substantially against said fuel nozzle to intersect the whirl through said spiral apertures for atomizing the fuel injected through said nozzle.

4. In an apparatus of the character described in combination with a burner casing, a mixing chamber within and near the mouth of said casing having a flaring opening at its inner end, a cup-shaped member within said casing forming an annular space therewith adapted to conduct compressed combustion air and having its inner end contracted and extending part way into the flaring end of said chamber with a space of suitable width between it and the chamber wall, vanes on said end of said member forming in said space a plurality of spirally shaped apertures to conduct part of the combustion air, a fuel nozzle disposed in said cup-shaped member adapted to inject fuel into said mixing chamber, said chamber having a circularly disposed group of apertures in its wall inclined in their direction to lead the other part of said combustion air into the chamber substantially against said fuel nozzle to intersect the whirl through said spiral apertures for atomizing the fuel injected through said nozzle, and means for regulating the size of said apertures.

5. In an apparatus of the character described in combination with a burner casing, a mixing chamber within and near the mouth of said casing, having a flaring opening at its inner end, a cup-shaped member within said casing forming an annular space therewith adapted to conduct compressed combustion air and having its inner end contracted and extending part way into the flaring end of said chamber with a space of suitable width between it and the chamber wall, vanes on said end of said member forming in said space a plurality of spirally shaped apertures to conduct part of the combustion air, a fuel nozzle disposed in said cup-shaped member adapted to inject fuel into said mixing chamber, said chamber having a circularly disposed group of apertures in its wall inclined in their direction to lead the other part of said combustion air into the chamber substantially against said fuel nozzle to intersect the whirl through said spiral apertures for atomizing the fuel injected through said nozzle; a ring on the outside of said mixing chamber adapted to close the apertures in the walls of said chamber, said ring connected to said cup-shaped member, said cup-shaped member adjustably threaded into said casing to increase or decrease when rotated the size of the air conducting apertures.

In witness whereof I have hereunto set my hand in presence of two witnesses.

AUGUST KOCH.

Witnesses:
ROBERT V. BÜLOW,
ROBERT J. THOMPSON.